United States Patent

Muller

(10) Patent No.: US 9,887,875 B2
(45) Date of Patent: Feb. 6, 2018

(54) LAYER 3 HIGH AVAILABILITY ROUTER

(71) Applicant: Red Hat Israel, Ltd., Raanana (IL)

(72) Inventor: Assaf Muller, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 113 days.

(21) Appl. No.: 14/978,745

(22) Filed: Dec. 22, 2015

(65) Prior Publication Data

US 2016/0191304 A1 Jun. 30, 2016

Related U.S. Application Data

(60) Provisional application No. 62/098,837, filed on Dec. 31, 2014.

(51) Int. Cl.

| | |
|---|---|
| *H04L 1/00* | (2006.01) |
| *H04L 12/24* | (2006.01) |
| *H04L 29/12* | (2006.01) |
| *H04L 12/931* | (2013.01) |
| *H04L 12/713* | (2013.01) |
| *H04L 12/703* | (2013.01) |
| *H04L 12/26* | (2006.01) |

(52) U.S. Cl.
CPC .......... *H04L 41/0668* (2013.01); *H04L 45/28* (2013.01); *H04L 45/586* (2013.01); *H04L 49/70* (2013.01); *H04L 61/2007* (2013.01); *H04L 43/0811* (2013.01); *H04L 43/10* (2013.01)

(58) Field of Classification Search
CPC ..... H04L 41/0668; H04L 45/22; H04L 45/28; H04L 41/04; H04L 41/085; H04B 10/032; H04B 10/038; H04J 14/0287; H04J 14/0289; H04J 14/029; H04J 14/0291; H04J 14/0293; H04J 14/0294; H04J 14/0295; H04J 14/0297
USPC .................... 370/219, 254, 389, 395.52, 220
See application file for complete search history.

(56) References Cited

U.S. PATENT DOCUMENTS 9,100,274 B1 * 8/2015 Ghosh .................... H04L 49/70

OTHER PUBLICATIONS

Configuring Active/Active HA Jun. 4, 2014 B Palo Alto Networks.*
"Neutron/L3 High Availability VRRP—OpenStack," https://wiki.openstack.org/wiki/Neutron/L3_High_Availability_VRRP, Sep. 22, 2015, 11 pages.
Muller, Assaf, "Layer 3 High Availability," assafmuller.com/2014/08/16/layer-3-high-availability/, Aug. 16, 2014, 17 pages.

* cited by examiner

*Primary Examiner* — Dady Chery
(74) *Attorney, Agent, or Firm* — Lowenstein Sandler LLP

(57) ABSTRACT

Systems and methods for providing Open Systems Interconnection (OSI) layer 3 highly-available routers. An example method comprises: receiving a request to create a highly-available (HA) virtual router; configuring a HA virtual router to run on a plurality of network nodes, the HA virtual router comprising a master instance and a plurality of standby instances; assigning a floating Internet Protocol (IP) address associated with the virtual router to an internal network interface of the master instance; responsive to detecting a failure of the master instance of the HA virtual router, identifying a standby instance to act as a new master instance; and assigning the floating IP address to an internal network interface of the new master instance.

16 Claims, 4 Drawing Sheets

LAYER 3 HIGH AVAILABILITY ROUTER

CROSS-REFERENCE TO RELATED APPLICATIONS

This application claims the priority benefit of provisional U.S. Patent Application No. 62/098,837, entitled "Layer 3 High Availability," filed Dec. 31, 2014, the entirety of which is incorporated herein by reference.

TECHNICAL FIELD

The present disclosure relates to cloud computing, and more particularly, to providing Open Systems Interconnection (OSI) layer 3 (L3) highly-available routers.

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity and measured service. The cloud computing model comprises several service models, including Software as a Service (SaaS), Platform as a Service (PaaS), and Infrastructure as a Service (IaaS). The cloud computing model may be implemented according to one of the several deployment models, including private cloud, community cloud, public cloud and hybrid cloud.

Cloud infrastructure is a collection of hardware and software that implements the cloud computing model. Cloud infrastructure may be viewed as comprising a physical layer and an abstraction layer. The physical layer may comprise hardware resources designed to support the cloud services being provided, and typically includes server, storage and network components. The abstraction layer may comprise the software deployed across the physical layer, which manifests the essential cloud characteristics. Conceptually, the abstraction layer resides above the physical layer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
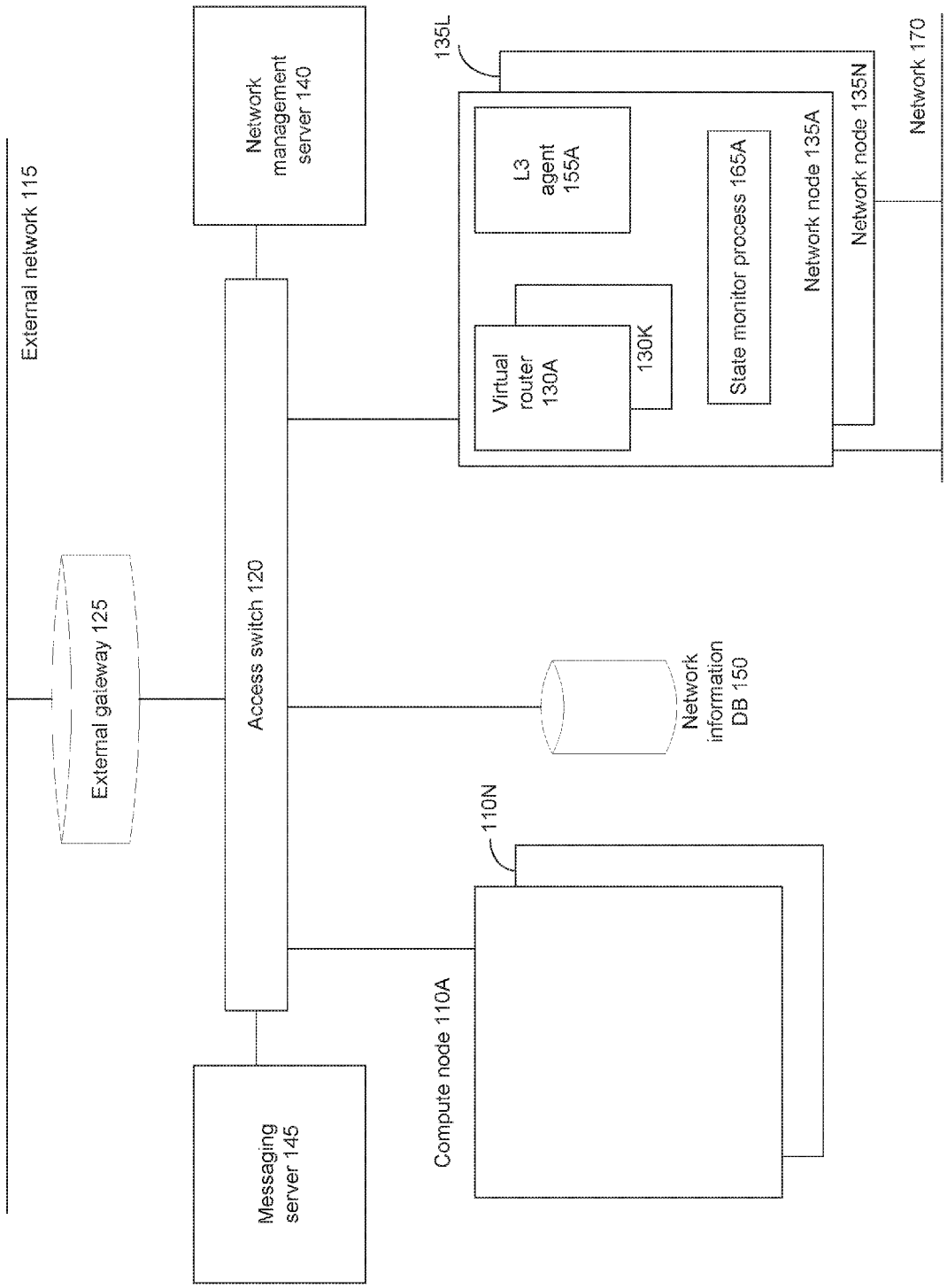
FIG. 1 depicts a high-level network diagram of an example cloud computing environment 100 in which the systems and methods for providing OSI layer 3 highly-available routers may be implemented, in accordance with one or more aspects of the present disclosure.

Described herein are systems and methods for providing OSI layer 3 highly-available routers. "Router" herein shall refer to a computer system equipped with at least two network interfaces and employed for routing OSI layer 3 (network layer) packets between the networks connected to the respective network interfaces.

In a cloud computing environment, a networking service may support a multi-tenant model, in which each tenant may have one or more private networks with customized Internet Protocol (IP) addressing schemes. The networking service exports a networking application programming interface (API) that includes virtual network, subnet, and port abstractions that are designed to describe various networking resources. In various illustrative examples, the networking service may enable advanced cloud networking use cases, such as high-availability (HA) multi-tiered web applications.

In order to host high availability applications, a variety of network services, including Open Systems Interconnection (OSI) layer 3 routers, should also possess high availability features. In common implementations, a periodically running script (e.g., a cron job) may query the network management unit for a list of network nodes that failed to transmit a heartbeat message in a pre-determined time and thus are deemed non-responsive. The script may then migrate, to other nodes, all virtual router instances residing on each non-responsive node. Such approach, however, suffers a long failover time (as virtual router instances are migrated sequentially) and is also susceptible to the network management unit being a single point of failure: if the server is down or unreachable, the list of non-responsive router instances may be not retrieved.

Aspects of the present disclosure address this and other deficiencies by providing a method of providing OSI layer 3 highly-available routers. In accordance with one or more aspects of the present disclosure, responsive to receiving a request to create a HA virtual router, the network management unit may configure a plurality of instances of a virtual router to run on a plurality of network nodes. A floating virtual IP address may be reserved for the internal interface of each virtual router, and may be assigned to the master instance of the virtual router. Other instances of the virtual router may be referred to as standby instances. The floating IP address associated with the internal interface of the virtual router may be specified as the default gateway address for participating hosts on the tenant network, thus enabling L3 routing for applications being executed by those hosts. If the master instance of the virtual router or its uplink fails, one of the standby instances may be elected as the new master, and the IP addresses of the external and internal interfaces of the virtual router may be assigned to the newly elected master instance.

Various aspects of the above referenced methods and systems are described in details herein below by way of examples, rather than by way of limitation.

FIG. 1 depicts a high-level network diagram of an example cloud computing environment 100 in which the systems and methods for providing OSI layer 3 highly-available routers may be implemented, in accordance with one or more aspects of the present disclosure. As schematically illustrated by FIG. 1, example cloud computing environment 100 may comprise one or more compute nodes represented by host computer systems 110A-110N hosting virtual machines that are assigned to one or more cloud tenants. Compute nodes 110A-110N may be communicatively coupled to an external network 115 via an access switch 120 and a gateway 125. The L3 routing between compute nodes 110A-110N and gateway 125 may be provided by one or more virtual routers 130A-130K running on one or more network nodes 135A-135L. In certain implementations, virtual routers 130A-130K may further provide stateless filtering of OSI layer 3 packets being routed between compute nodes 110A-110N and gateway 125.

Network nodes 135A-135L may be provided by computer systems (servers) employed to handle and manage the network traffic within example cloud computing environment 100. Network management unit 140 may be running on a dedicated computer system (server) or may be collocated with one or more functional components of example cloud computing environment 100. Network management unit 140 may provide the centralized management functions with respect to network nodes 135A-135L. In certain implementations, network management unit 140 may expose an application programming interface (API) (e.g., an HTTP-based request-response protocol) through which other functional components of example cloud computing environment 100, such as an administrative user interface, may issue commands and receive responses to and from network management unit 140. In certain implementations, network management unit 140 may communicate, e.g., via a messaging server 145, to a network service database 150, where the network configuration and other relevant information may be stored.

In accordance with one or more aspects of the present disclosure, network management unit 140 may receive, via the exposed API, request to create a virtual router. The router creation request may specify the router name and the high availability attribute (e.g., HA=true or false). Responsive to receiving the router creation request, network management unit 140 may configure L3 agents 155A-155N running on respective network nodes 135A-135N to run virtual router instances 130A-130N. One of the virtual router instances 130A-130N may be designated as the master instance, while other instances become standby instances.

A floating virtual IP addresses may be reserved for the internal interface of the virtual router 130, and thus may be assigned to the master instance. The floating IP address associated with the internal interface of the virtual router may be specified as the default gateway address for compute nodes 110A-110N, thus providing L3 routing between virtual machines running on compute nodes 110A-110N and external gateway 125.

If the master instance of the virtual router or its uplink fails, one of the standby instances may be elected as the new master. In an illustrative example, a state monitor process 165 may run on each network node 135. Each instance of the virtual router may be configured to transmit, over a highly-available network 170, heartbeat messages to the network nodes running the standby instances of the same virtual router. As the heartbeat messages should be transmitted with a pre-defined frequency (e.g., every 2 seconds), the state monitor process associated with a standby instance failing to receive a pre-defined number of consecutive heartbeat messages from the master instance may initiate a new master instance election among the standby instances.

The master instance election may be performed using pre-configured node priorities, randomly assigned identifiers, and/or unique identifiers associated with the network nodes on which the standby instances are running. Once the new master instance is elected, the floating IP addresses which have been reserved for the internal interface of the corresponding virtual router may be disassociated from the failed master instance and assigned to the internal interface of the newly elected master instance.

Figure 2:
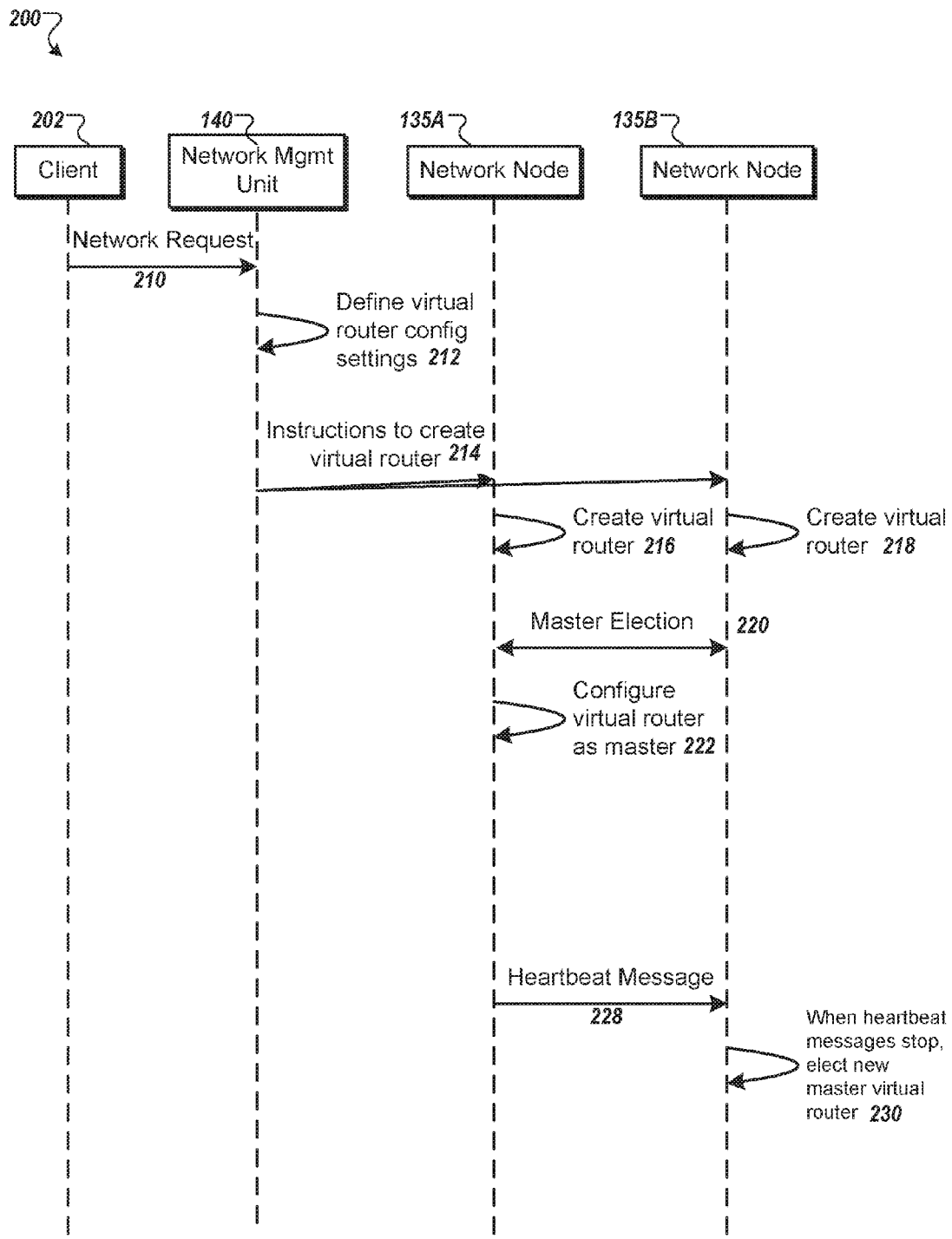
FIG. 2 schematically illustrates a sequence diagram 200 for providing OSI layer 3 highly-available routers in an example cloud computing environment, in accordance with one or more aspects of the present disclosure.

FIG. 2 schematically illustrates a sequence diagram 200 for providing OSI layer 3 highly-available routers in an example cloud computing environment, in accordance with one or more aspects of the present disclosure. As schematically illustrated by FIG. 2, client 202 may transmit, to network management unit 140, a request 210 to create a virtual router. Responsive to receiving the request, network management unit 140 can define new virtual router configuration settings (212) for the virtual router and can store the router configuration settings in a data storage (e.g., network service database 150 of FIG. 1). The virtual router configuration settings can comprise Media Access Control (MAC) and IP addresses of the internal and external interfaces of the router table and a routing table to be implemented by the router.

Network management unit 140 can cause multiple instances of a virtual router to be created, each on a different network node 135. For each virtual router to be created, network management unit 140 may select at least a subset of network nodes 135 to host the virtual router instances. The network nodes 135 for creating instances of a given virtual router may be selected, e.g., randomly, or based on one or more selection criteria (e.g., selecting network nodes that are currently hosting the least number of virtual router instances, handle the least amount of network traffic, or use the least amount of a certain computing resource).

In the illustrative example of FIG. 2, network management unit 140 may cause the L3 agents residing on network nodes 135A-135B to create identical instances of a virtual router (214). The command to create an instance of a virtual router transmitted by network management unit 140 to each network node 135 can comprise the virtual router configuration settings. Responsive to receiving command 214, each network node 135A-135B may configure a virtual router instance using the received router configuration settings (216, 218).

Upon creating the virtual router instances, the master instance can be elected (220) among the instances running on nodes 135A-135B, and the remaining instances can be designated as standby instances. The master instance election may be performed using pre-configured node priorities, randomly assigned identifiers, and/or unique identifiers associated with the network nodes on which the standby instances are running. Once the new master instance is elected, the IP addresses which have been reserved for the router interfaces may be assigned (222) to the master instance.

In operation, the master instance of the virtual router may be configured to transmit, over a highly-available network, heartbeat messages (228) to the network nodes running the standby instances of the same virtual router. As the heartbeat messages should be transmitted with a pre-defined frequency (e.g., every 2 seconds), a state monitor process associated with a standby instance failing to receive a pre-defined number of consecutive heartbeat messages from the master instance may initiate a new master instance election (230) among the standby instances, as described in more details herein above.

Figure 3:
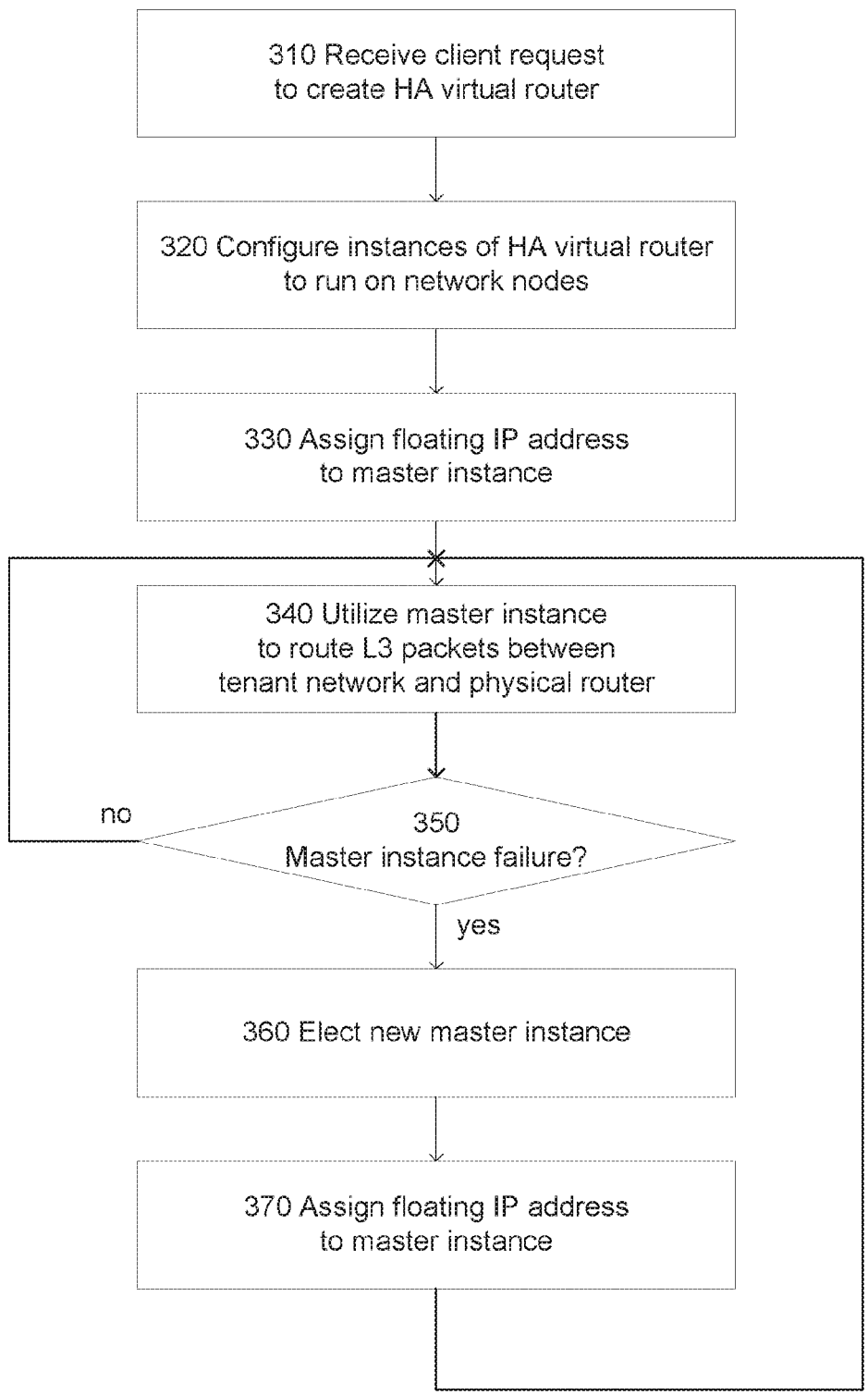
FIG. 3 depicts a flow diagram of a method of providing OSI layer 3 highly-available routers, in accordance with one or more aspects of the present disclosure.

FIG. 3 depicts a flow diagram of one illustrative example of method 300 of providing OSI layer 3 highly-available routers, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device implementing the method may receive, via an API (e.g., an HTTP-based request-response protocol), a client request to create a highly-available (HA) virtual router. The router creation request may specify the router name and the high availability attribute, as described in more details herein above.

At block 320, the processing device may configure instances of a HA virtual router to run on a plurality of network nodes. One of the virtual router instances 130A-130N may be designated as the master instance, while other instances become standby instances, as described in more details herein above.

At block 330, the processing device may assign a floating IP address associated with the virtual router to the internal network interface of the master instance, as described in more details herein above.

At block 340, the processing device may cause the master instance to route L3 packets between the tenant network and the physical router, as described in more details herein above.

Responsive to detecting, at block 350, a failure of the master instance of the HA virtual router, the processing device may, at block 360, identify a standby instance to act as a new master instance. The master instance election may be performed using pre-configured node priorities, randomly assigned identifiers, and/or unique identifiers associated with the network nodes on which the standby instances are running, as described in more details herein above.

At block 370, the processing device may assign the floating IP address to the internal network interface of the new master instance, as described in more details herein above, and the method may loop back to block to block 340.

Figure 4:
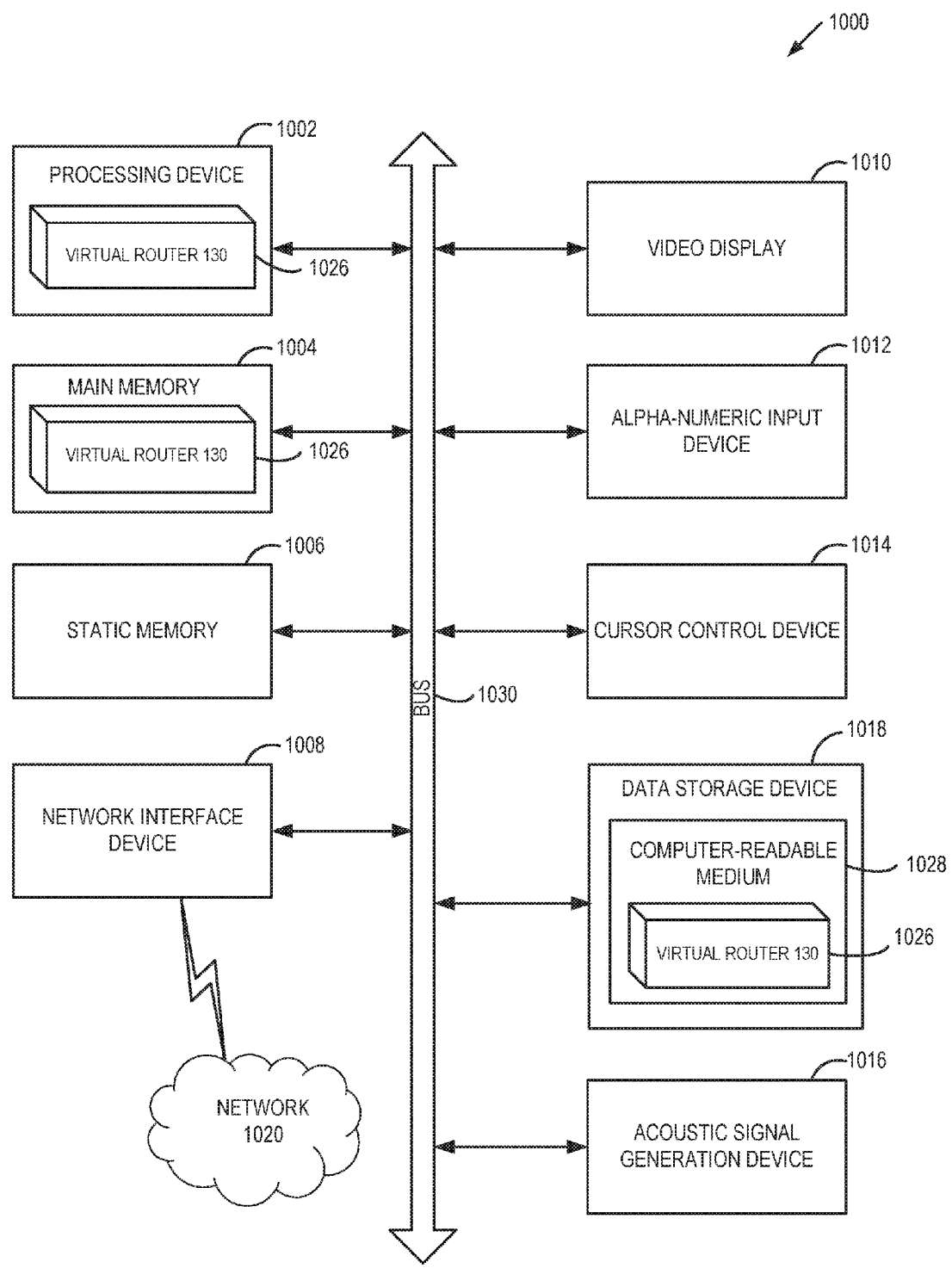
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent a compute node 110 and/or a network node 135 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 300 for providing OSI layer 3 highly-available routers.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 300 for providing OSI layer 3 highly-available routers.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
receiving, by a processing device, a request to create a highly-available (HA) virtual router;
configuring a HA virtual router to run on a plurality of network nodes, the HA virtual router comprising a master instance and a plurality of standby instances;
assigning a floating Internet Protocol (IP) address associated with the HA virtual router to an internal network interface of the master instance;
causing the HA virtual router to perform stateless filtering of OSI layer 3 packets being routed between a tenant network and a physical router;
responsive to detecting a failure of the master instance of the HA virtual router, identifying a standby instance to act as a new master instance; and
assigning the floating IP address to an internal network interface of the new master instance.

2. The method of claim 1, wherein configuring the HA virtual router further comprises identifying a HA network for routing heartbeat messages between instances of the HA virtual router.

3. The method of claim 1, wherein detecting the failure of the master instance of the HA virtual router comprises failing to receive, from the master instance, heartbeat messages for a period of time exceeding a threshold value.

4. The method of claim 1, wherein detecting the failure of the master instance of the HA virtual router comprises detecting a failure of an uplink connecting a network node running the master instance of the HA virtual router to a physical router.

5. The method of claim 1, wherein receiving the request comprises receiving an application programming interface (API) call.

6. The method of claim 1, wherein identifying the standby instance to act as the new master instance comprises selecting, among the plurality of standby instances, a standby instance having a highest pre-configured priority.

7. The method of claim 1, wherein identifying the standby instance to act as the new master instance comprises randomly selecting a standby instance among the plurality of standby instances.

8. A system comprising:
a memory; and
a processing device, operatively coupled to the memory, to:
receive a request to create a highly-available (HA) virtual router;
configure a HA virtual router to run on a plurality of network nodes, the HA virtual router comprising a master instance and a plurality of standby instances;
assign a floating Internet Protocol (IP) address associated with the virtual router to an internal network interface of the master instance;
cause the HA virtual router to perform stateless filtering of OSI layer 3 packets being routed between a tenant network and a physical router;
responsive to detecting a failure of the master instance of the HA virtual router, identify a standby instance to act as a new master instance; and
assigning the floating IP address to an internal network interface of the new master instance.

9. The system of claim 8, wherein configuring the HA virtual router further comprises identifying a HA network for routing heartbeat messages between the instances of the HA virtual router.

10. The system of claim 8, wherein detecting the failure of the master instance of the HA virtual router comprises failing to receive, from the master instance, heartbeat messages for a period of time exceeding a threshold value.

11. The system of claim 8, wherein detecting the failure of the master instance of the HA virtual router comprises detecting a failure of an uplink connecting a node running the master instance of the HA virtual router to a physical router.

12. The system of claim 8, wherein receiving the request comprises receiving an application programming interface (API) call.

13. The system of claim 8, wherein identifying the standby instance to act as the new master instance comprises selecting, among the plurality of standby instances, a standby instance having a highest pre-configured priority.

14. The system of claim 8, wherein identifying the standby instance to act as the new master instance comprises randomly selecting a standby instance among the plurality of standby instances.

15. A computer-readable non-transitory storage medium comprising executable instructions to cause a processing device to:

receive, by the processing device, a request to create a highly-available (HA) virtual router;

configure a HA virtual router to run on a plurality of network nodes, the HA virtual router comprising a master instance and a plurality of standby instances;

assign a floating Internet Protocol (IP) address associated with the virtual router to an internal network interface of the master instance;

cause the HA virtual router to perform stateless filtering of OSI layer 3 packets being routed between a tenant network and a physical router;

responsive to detecting a failure of the master instance of the HA virtual router, identify a standby instance to act as a new master instance;

assign the floating IP address to an internal network interface of the new master instance; and cause the virtual router to route Open Systems Interconnection (OSI) layer 3 packets between a tenant network and a physical router.

16. The computer-readable non-transitory storage medium of claim 15, wherein detecting the failure of the master instance of the HA virtual router comprises failing to receive, from the master instance, heartbeat messages for a period of time exceeding a threshold value.

\* \* \* \* \*